United States Patent
Usui

(10) Patent No.: US 10,551,959 B2
(45) Date of Patent: Feb. 4, 2020

(54) TOUCH INPUT DEVICE AND ELECTRONIC DEVICE

(71) Applicant: ROHM CO., LTD., Ukyo-Ku, Kyoto (JP)

(72) Inventor: Hirotoshi Usui, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 21 days.

(21) Appl. No.: 15/348,361

(22) Filed: Nov. 10, 2016

(65) Prior Publication Data

US 2017/0139528 A1    May 18, 2017

(30) Foreign Application Priority Data

Nov. 12, 2015    (JP) .................... 2015/221852

(51) Int. Cl.
*G06F 3/045* (2006.01)
*G06F 3/041* (2006.01)

(52) U.S. Cl.
CPC .......... *G06F 3/0416* (2013.01); *G06F 3/045* (2013.01); *G06F 2203/04112* (2013.01)

(58) Field of Classification Search
CPC ................. G06F 3/045; G06F 3/0416; G06F 2203/04104
See application file for complete search history.

(56) References Cited

U.S. PATENT DOCUMENTS

| | | | | |
|---|---|---|---|---|
| 5,496,974 A * | 3/1996 | Akebi | ..................... | G06F 3/045 178/18.05 |
| 2008/0227308 A1 * | 9/2008 | Fujii | ..................... | G06F 3/0416 439/66 |
| 2012/0113054 A1 * | 5/2012 | Hashimoto | ........... | G06F 3/0414 345/174 |
| 2012/0268419 A1 * | 10/2012 | Matsuda | ................. | G06F 3/045 345/174 |
| 2013/0277192 A1 * | 10/2013 | Nakajima | ............... | G06F 3/045 200/512 |
| 2015/0309651 A1 * | 10/2015 | Papakostas | ........... | G06F 3/0414 345/174 |

FOREIGN PATENT DOCUMENTS

| | | |
|---|---|---|
| JP | S62120382 U | 7/1987 |
| JP | H01281518 A | 11/1989 |
| JP | 2005141643 A | 6/2005 |
| JP | 2005251692 A | 9/2005 |
| JP | 2006048388 A | 2/2006 |
| JP | 2009048233 A | 3/2009 |
| JP | 2011059771 A | 3/2011 |

OTHER PUBLICATIONS

JPO Notification of Reasons for Refusal corresponding to Application No. 2015-221852; dated Apr. 23, 2019.

* cited by examiner

*Primary Examiner* — Yuzhen Shen
(74) *Attorney, Agent, or Firm* — Cantor Colburn LLP

(57) ABSTRACT

A touch type input device includes: a resistive film; an electrode formed along a portion of an outer periphery of the resistive film; a conductor installed with a gap between the resistive film and the conductor; a first line drawn from the electrode; and a second line connected to the conductor, wherein the resistive film and the conductor are configured to contact in a position touched by a user.

10 Claims, 14 Drawing Sheets

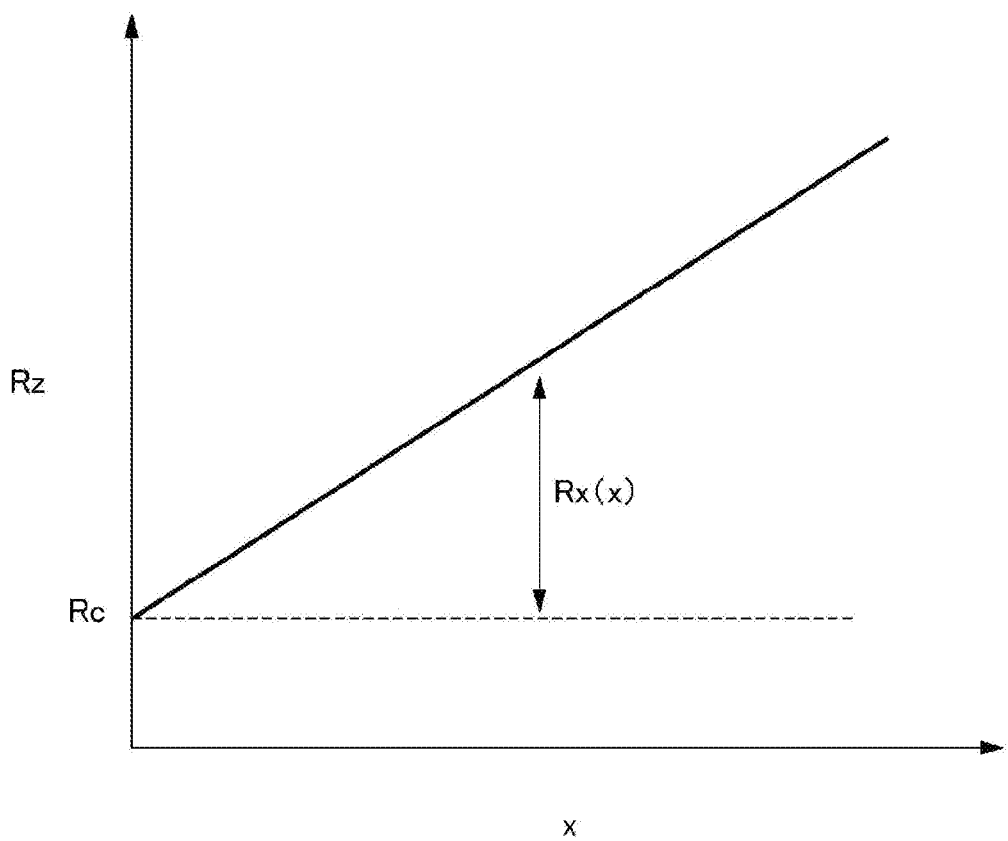

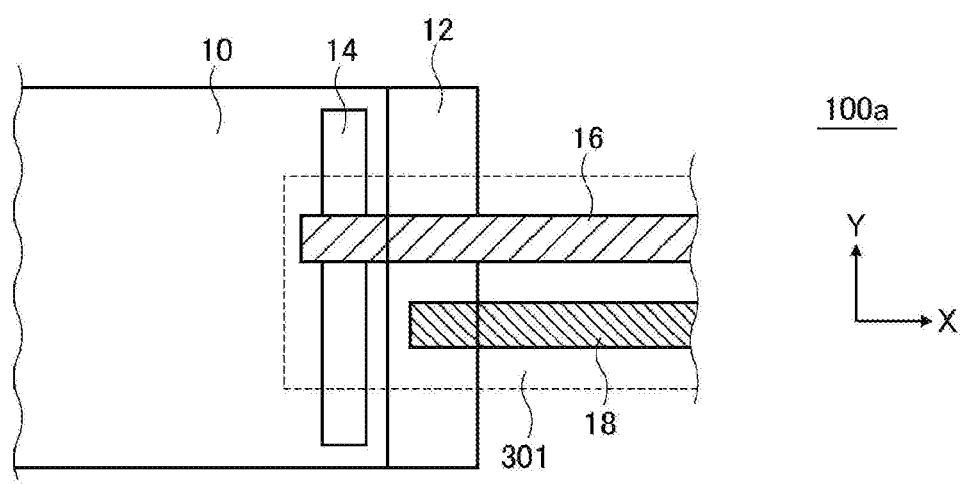

TOUCH INPUT DEVICE AND ELECTRONIC DEVICE

CROSS-REFERENCE TO RELATED APPLICATION(S)

This application is based upon and claims the benefit of priority from Japanese Patent Application No. 2015-221852, filed on Nov. 12, 2015, the entire contents of which are incorporated herein by reference.

TECHNICAL FIELD

The present disclosure relates to a touch type input device using a resistive film.

BACKGROUND

In electronic devices such as a smartphone, a tablet terminal, a notebook computer, a portable audio device, a digital camera, a game machine, and a car navigation device, it recently is becoming more standard to have an input device to operate the electronic devices with a touch or contact of a finger. As such an input device, a resistive touch panel (touch sensor) or the like is known.

FIGS. 1A and 1B are views illustrating a structure of a resistive touch panel. The resistive touch panel (hereinafter, simply referred to as a "touch panel") 900 includes a first resistive film 902 and a second resistive film 904. The first resistive film 902 and the second resistive film 904 are installed to be spaced apart from each other in a Z direction. A first electrode 906 and a second electrode 908 are formed in the first resistive film 902 along two sides extending in an X direction. A third electrode 910 and a fourth electrode 912 are formed in the second resistive film 904 along two sides extending in a Y direction. Lines (or terminals) $X_P$, $X_N$, $Y_P$, and $Y_N$ connected to the four electrodes are drawn out from one common side 914.

A touch is detected in a state where a predetermined voltage $V_P$ is applied to the line $X_P$ and a voltage $V_N$ is applied to the line $Y_N$. In this state, when the user's finger makes a contact with the touch panel 900, an electrical state, i.e., a voltage or a current, generated in the lines $X_N$ and $Y_P$ is changed depending on contacted coordinates. Thus, the coordinates may be calculated by measuring the electrical state of the lines $X_N$ and $Y_P$.

In FIG. 1B, a cross-section of a joint part of a resistive film 920 and an electrode 922 is illustrated. Since the electrode 922 has a certain height h, a dead space (invalid region) 924 where coordinates cannot be detected exists near the electrode 922. Thus, a width (length) of the panel becomes longer by the invalid region than a width (length) of a region available for a coordinate detection. While a size of the invalid region largely relies on a material or a manufacturer of a resistive film or an electrode, the size of the invalid region is generally about 0.4 mm to 10 mm. When an area of the touch panel 900 is sufficiently large, the invalid region is not problematic. However, when invalid regions of 1 cm are required at both ends, for example, in a 3 cm-panel, a valid region becomes merely 1 cm.

SUMMARY

The present disclosure provides some embodiments of a touch type input device with a reduced invalid region.

According to one embodiment of the present disclosure, there is provided a touch type input device. The touch type input device includes: a resistive film; an electrode formed along a portion of an outer periphery of the resistive film; a conductor installed with a gap between the resistive film and the conductor; a first line drawn from the electrode; and a second line connected to the conductor, wherein the resistive film and the conductor are configured to contact in a position touched by a user.

An impedance (resistance value) between the first line and the second line is changed depending on a distance between a touched position (input position) and an electrode. Thus, it is possible to detect a presence or absence of an input or a one dimensional coordinate of an input position. In the above-described embodiment, since one electrode is provided, it is possible to reduce an area of an invalid region generated by the electrode, compared with a 4-way resistive touch panel. In addition, since the number of lines can be reduced to two, it is possible to simplify the structure.

The first line and the second line may be accommodated in a single cable and installed to be spaced apart from each other in a same plane in the cable. The first line and the second line may be exposed from a same surface in an end portion of the cable.

The first line and the second line may be accommodated in a single cable and installed to be spaced apart from each other in a same plane in the cable. The first line may be exposed from one surface in an end portion of the cable and the second line may be exposed from another surface opposing the one surface in the end portion of the cable. The cable may be interposed between the electrode and the conductor in the end portion.

The first line and the second line may be accommodated in a single cable and form a stacked structure with an insulating layer interposed therebetween in the cable. The first line and the second line may be exposed from a same surface in an end portion of the cable.

The first line and the second line may be accommodated in a single cable and form a stacked structure with an insulating layer interposed therebetween in the cable. The first line may be exposed from one surface in an end portion of the cable and the second line may be exposed from another surface opposing the one surface in the end portion of the cable. The cable may be interposed between the electrode and the conductor therebetween in the end portion.

The conductor may be a portion of a metal of an electronic device on which the touch type input device is mounted.

The conductor may have a mesh structure. With this configuration, the input device can become transparent. Thus, it is possible to dispose the touch type input device on a display panel in an overlapping manner.

According to another embodiment of the present disclosure, there is provided an electronic device. The electronic device may include: the touch type input device as described above; and a control circuit connected to the first line and the second line of the touch type input device and configured to detect a user input.

The control circuit may be configured to detect a presence or absence of a user touch. In this case, the touch type input device may be used as switch.

The control circuit may be configured to detect a coordinate of a position touched by the user in a direction perpendicular to the electrode. In this case, the touch type input device may be used as a slide type input device.

Further, arbitrarily combining the foregoing components or substituting the components or expressions of the present disclosure with one another among a method, an apparatus, and a system is also effective as an embodiment of the present disclosure.

BRIEF DESCRIPTION OF THE DRAWINGS

FIG. 4 is a view illustrating a relationship between an X coordinate of a touched position Pu and a resistance value between a first line and a second line.

FIGS. 7A to 7C are views illustrating a structure of a first configuration example of the touch type input device.

DETAILED DESCRIPTION

Figure 1A:
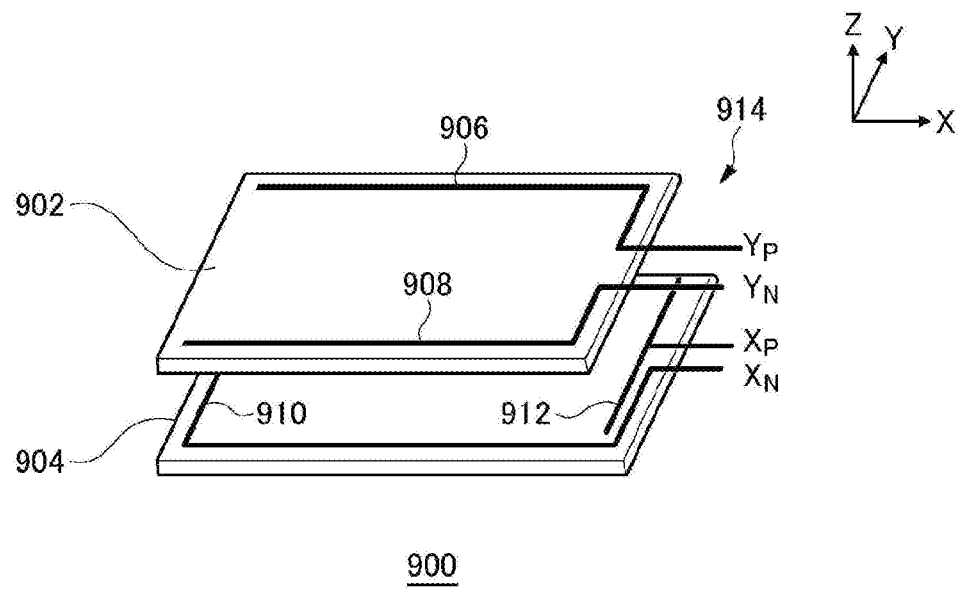
FIGS. 1A and 1B are views illustrating a structure of a resistive touch panel.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 2:
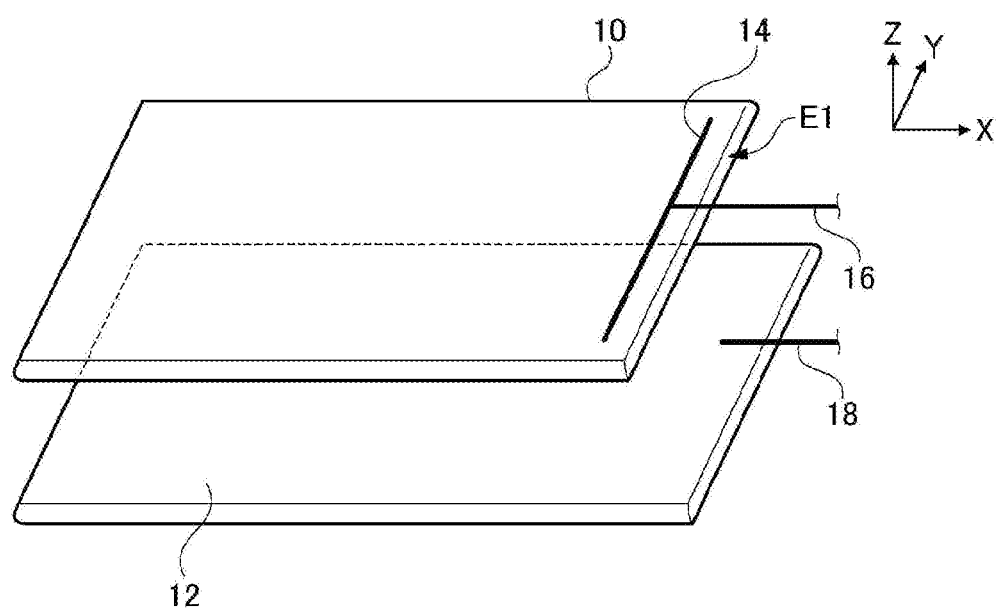
FIG. 2 is a perspective view of a touch type input device according to an embodiment of the present disclosure.

FIG. 2 is a perspective view of a touch type input device 100 according to an embodiment of the present disclosure. Further, it should be noted that respective members illustrated herein are appropriately enlarged or reduced to facilitate the understanding of the present disclosure and simplify the description of the present disclosure, and thus, the magnitude relationship of the dimensions of the respective members is not limited to the illustrated one.

A touch type input device 100 has a resistive film 10, a conductor 12, an electrode 14, a first line 16, and a second line 18. Here, for the convenience of description, an X axis and a Y axis are defined in a plane including the resistive film 10, and a Z axis is defined in a direction perpendicular to the X axis and the Y axis. The resistive film 10 and the conductor 12 are parallel to the XY plane and disposed to overlap each other with a gap therebetween in the Z axis direction. The electrode 14 is formed in a portion of an outer periphery of the resistive film 10, specifically, along one side E1 of the resistive film 10. The first line 16 is drawn from the electrode 14, and the second line 18 is connected to the conductor 12. The second line 18 may also be drawn from the same side as that of the side E1 from which the first line 16 is drawn.

In the touch type input device 100, the resistive film 10 and the conductor 12 are configured to be contactable with each other in a position touched by a user. In this connection, a technique such as a 4-wire resistive touch panel may be used. In this embodiment, the conductor 12 is fixed and the resistive film 10 is deformable, and as the user touches the resistive film 10, the resistive film 10 and the conductor 12 contact each other.

Figure 3:
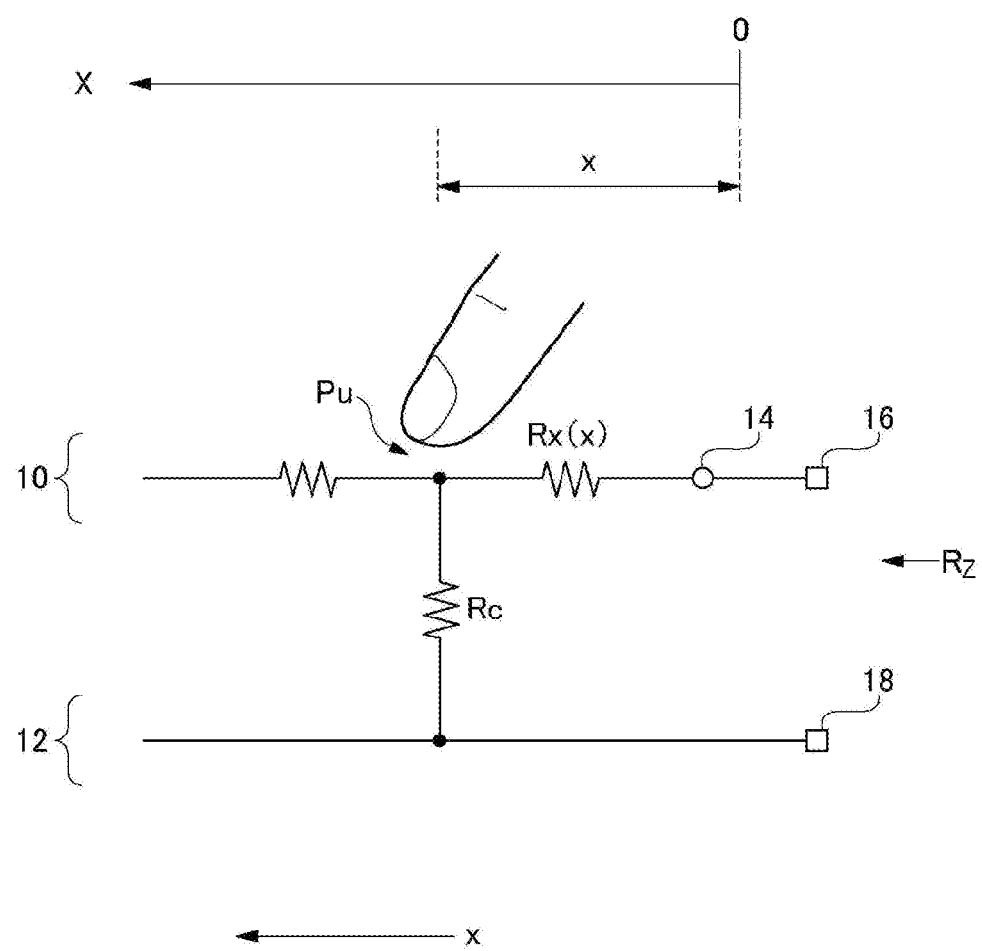
FIG. 3 is an equivalent circuit diagram of the touch type input device of FIG. 2.

The basic configuration of the touch type input device 100 has been described above. Next, an operational principle thereof will be described. FIG. 3 is an equivalent circuit diagram of the touch type input device 100 of FIG. 2. A reference symbol Pu denotes a position touched by the user. A resistance value of a resistor Rx between the user-touched position Pu and the electrode 14 relies on a distance x between the user-touched position Pu and the electrode 14 in the X direction. When a resistance value of the conductor 12 is sufficiently low, e.g., substantially approximate to zero, a resistance Rz between the first line 16 and the second line 18 becomes Rx+Rc, where Rc is a contact resistance of the resistive film 10 and the conductor 12 and may be regarded as a predetermined value. When compared with a resistance value of the resistive film 10, resistance values of the first line 16 and the second line 18 are also sufficiently small so that they may be assumed to be substantially zero.

FIG. 4 is a view illustrating a relationship between an X coordinate of the touched position Pu and a resistance value between the first line 16 and the second line 18. Here, the X axis is defined such that the electrode 14 is the origin (0) and the X coordinate is increased in a direction away from the electrode 14. The resistance Rx between the electrode 14 of the resistive film 10 and the touched position Pu is increased depending on the distance x, but a degree of increase relies on a shape of the resistive film 10, or the like. When a width of the resistive film 10 in the Y direction is narrow, the resistance Rx is in proportion to the distance x. Further, when a width of the resistive film 10 in the Y direction is increased, the resistance Rx may deviate from the proportional relationship, but anyway, a resistance value between the first line 16 and the second line 18 corresponds to the X coordinate of the position Pu touched by the user in a one-to-one manner. The characteristics illustrated in FIG. 4 may be measured in advance for each panel. In a non-contact state, since the distance x becomes infinite, the resistance Rz becomes also infinite.

The operational principle of the touch type input device 100 has been described above. According to the touch type input device 100, it is possible to detect the presence or absence of a touch or the X coordinate of the touched position Pu by directly or indirectly measuring the resistance Rz.

Figure 5A:
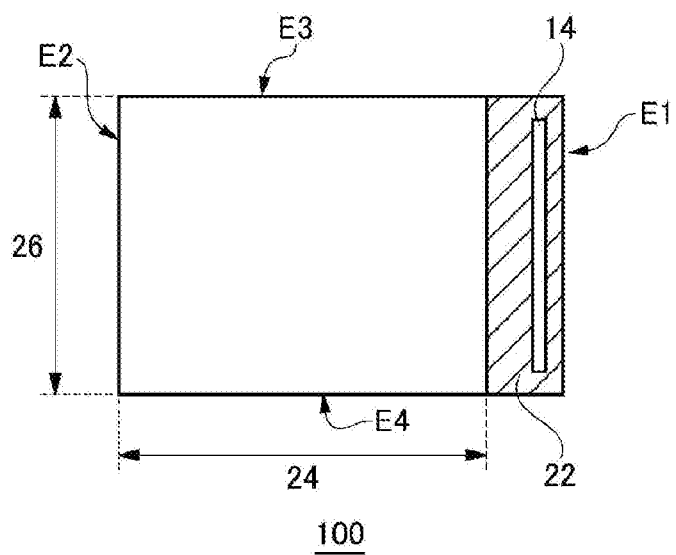
FIGS. 5A and 5B are views illustrating a valid region and an invalid region of the touch type input device of FIG. 2.
Figure 5B:
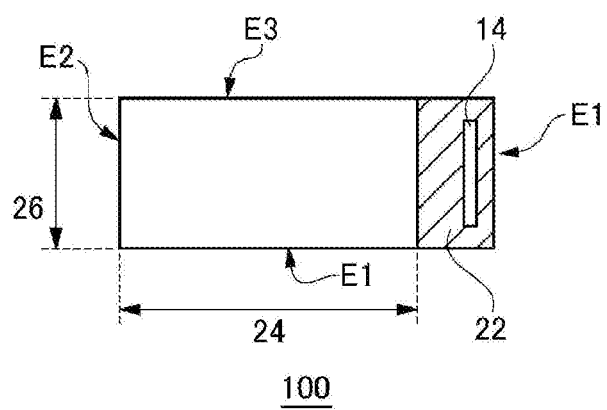
Figure 5C:
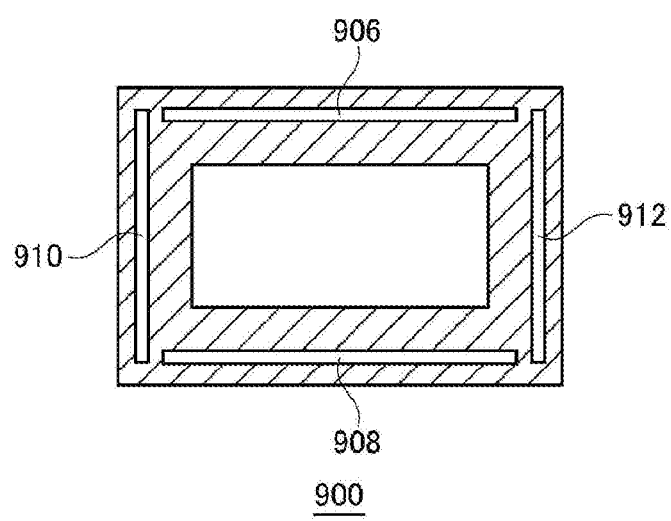
FIG. 5C is a view illustrating a valid region and an invalid region of the touch panel of FIG. 1.

FIGS. 5A and 5B are views illustrating a valid region and an invalid region of the touch type input device of FIG. 2. FIG. 5C illustrates a valid region and an invalid region of the touch panel 900 of FIG. 1 for comparison. In FIGS. 5A to 5C, the invalid region is hatched. The touch type input device 100 of FIG. 2 has only one electrode 14 which is formed in the resistive film 10 and extends in the Y direction. Thus, as illustrated in FIGS. 5A and 5B, regarding the X direction, an invalid region 22 is present only at the side of one side E1 where the electrode 14 is installed, while no invalid region is present at another side E2 opposing the side E1. Thus, a remaining region 24 becomes valid. Regarding the Y direction, no electrode is formed at two sides E3 and E4. Thus, the entire width of the resistive film 10 becomes a valid region 26.

Figure 1B:
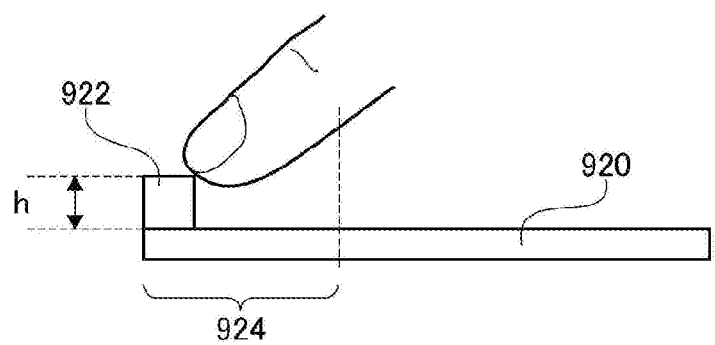

According to the touch type input device 100 of FIG. 2, it is possible to increase a ratio of the valid region to the entire area of the panel by expanding the valid region to each of the sides E2, E3 and E4, compared with the touch panel 900 of FIG. 1. That is to say, according to the touch type input device 100 of FIG. 2, as illustrated in FIG. 5A, a larger valid region can be obtained for the same area of a panel, compared with the touch panel 900 of FIG. 1. Or, as illustrated in FIG. 5B, the same area of a valid region can be realized in a smaller panel area, compared with the touch panel 900 of FIG. 1. These effects become more remarkable as an area of a panel decreases.

Further, since the number of lines is reduced to two, the structure can be simplified when compared with the 4-wire resistive touch panel. In the touch panel 900 of FIG. 1, a high degree of precision is required for the arrangement of the two resistive films 902 and 904. However, in the touch type input device 100 of FIG. 2, the resistive film 10 and the conductor 12 are only required to overlap with each other. Thus, manufacturing of the touch type input device can be simplified.

Figure 6A:
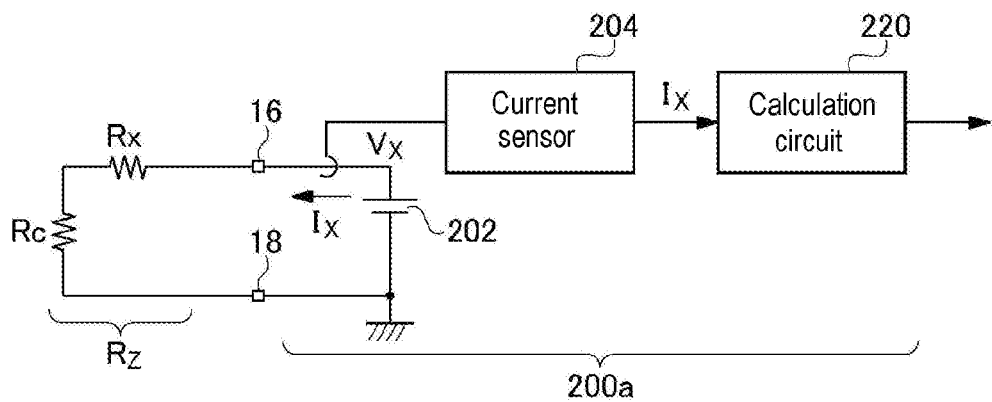
FIGS. 6A to 6C are circuit diagrams of a control circuit for controlling the touch type input device.
Figure 6B:
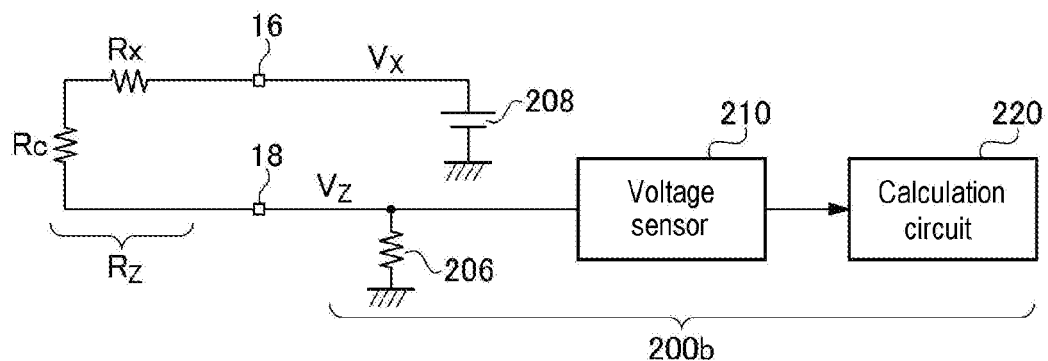
Figure 6C:
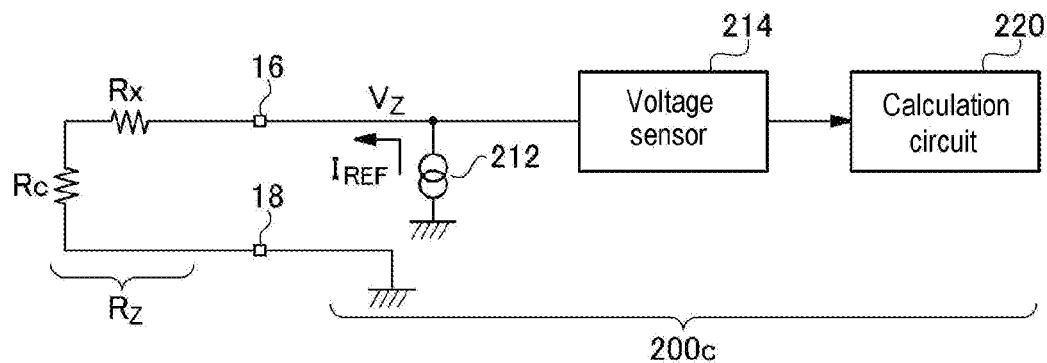

FIGS. 6A to 6C are circuit diagrams of a control circuit for controlling the touch type input device 100. In order to detect a touched position as described above, it is required to directly or indirectly measure the resistance Rz between the first line 16 and the second line 18. The control circuit is connected to the first line 16 and the second line 18 and detects the presence or absence of a touch or a touched position.

A control circuit 200a of FIG. 6A has a voltage source 202, a current sensor 204, and a calculation circuit 220. The voltage source 202 applies a predetermined voltage Vx between the first line 16 and the second line 18. The current sensor 204 measures a current Ix flowing at this time. The current Ix is expressed as follows:

$$Ix=Vx/Rz$$

The calculation circuit 220 calculates a coordinate of the touched position based on the measurement value of the current Ix and the predetermined voltage Vx or obtains it by referring to a table.

A control circuit 200b of FIG. 6B has a reference resistor 206, a voltage source 208, a voltage sensor 210, and a calculation circuit 220. The reference resistor 206 has a known resistance $R_{REF}$ and is installed between one side of the first line 16 and the second line 18 (the second line 18 side in FIG. 6B) and a ground. The voltage source 208 applies the known voltage Vx to the other side of the first line 16 and the second line 18 (the first line 16 side in FIG. 6B). The voltage sensor 210 measures a voltage Vz of the one side of the first line 16 and the second line 18 (the second line 18 side in FIG. 6B). The voltage Vz has a value obtained by dividing the voltage Vx by the resistances Rz and $R_{REF}$.

$$Vz=Vx\times R_{REF}/(Rz+R_{REF})$$

The calculation circuit 220 calculates a coordinate of the touched position based on the voltage Vz, the predetermined voltage Vx, and the reference resistance $R_{REF}$, or obtains it by referring to a table.

A control circuit 200c of FIG. 6C has a current source 212, a voltage sensor 214, and a calculation circuit 220. One side of the first line 16 and the second line 18 (the second line 18 side in FIG. 6C) is grounded. The current source 212 supplies a known constant current $I_{REF}$ to the other side of the first line 16 and the second line 18 (the first line 16 side in FIG. 6C). The voltage sensor 214 measures a voltage Vz generated in the first line 16. The voltage Vz is expressed as follows:

$$Vz=I_{REF}\times Rz$$

The calculation circuit 220 calculates a coordinate of the touched position based on the voltage Vz and the current $I_{REF}$, or obtains it by referring to a table.

Further, the configuration of the control circuit is not limited to the control circuits 200a to 200c of FIGS. 6A to 6C. For example, the touch type input device 100 may be controlled using a control circuit of a 4-wire resistive touch panel.

Figure 7A:
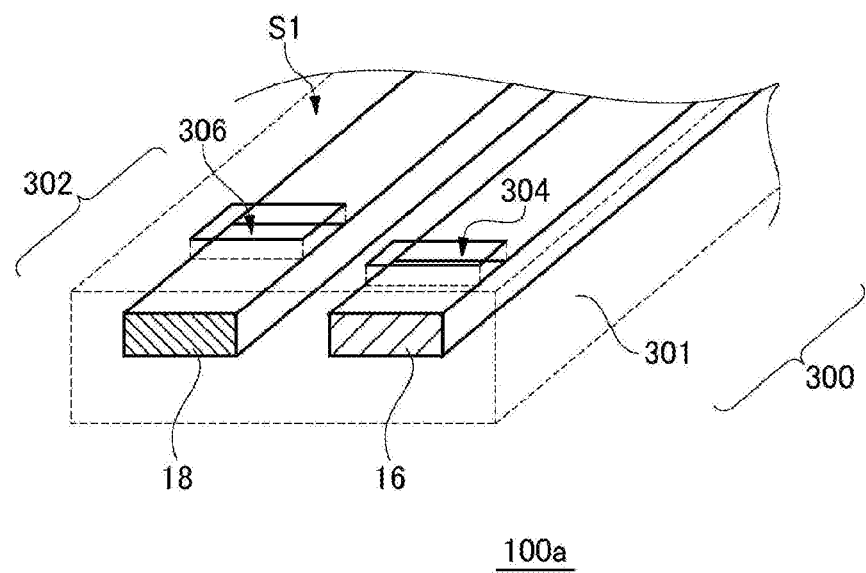
Figure 7B:
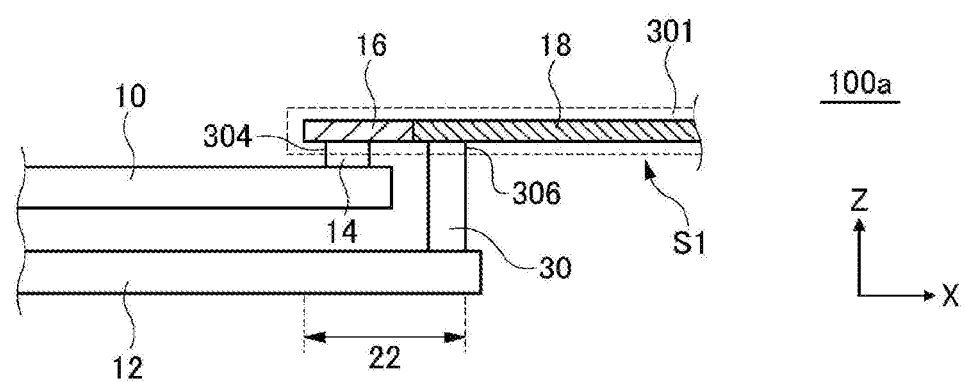

FIGS. 7A to 7C are views illustrating a structure of a first configuration example 100a of the touch type input device 100. As illustrated in FIG. 7A, the first line 16 and the second line 18 are accommodated in a single cable 300. In the cable 300, the first line 16 and the second line 18 are installed to be spaced apart from each other in a same plane and coated with an insulator 301. Openings 304 and 306 that communicate with the first line 16 and the second line 18, respectively, are installed on a same surface S1 in an end portion 302 of the cable 300, and thus, the first line 16 and the second line 18 are exposed from the same surface S1 side in the end portion 302 of the cable 200.

As illustrated in FIG. 7B, the cable 300 is disposed such that the surface S1 becomes a lower side, namely, to face the resistive film 10 and the conductor 12. The first line 16 is electrically and mechanically connected to the electrode 14 formed in the resistive film 10 through the opening 304. The second line 18 is connected to the conductor 12 through a post 30 that passes through the opening 306. The post 30 may be a solder, a conductive adhesive, or a through hole formed in a contact. FIG. 7C is a plan view of the first configuration example 100a of the touch type input device 100.

Figure 8A:
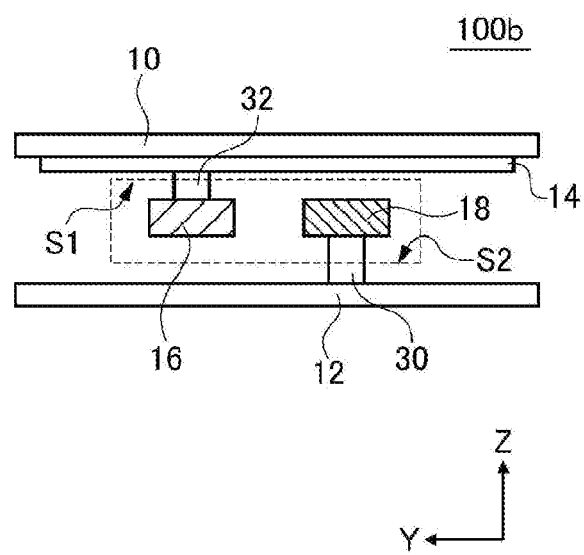
FIGS. 8A and 8B are views illustrating a structure of a second configuration example of the touch type input device.
Figure 8B:
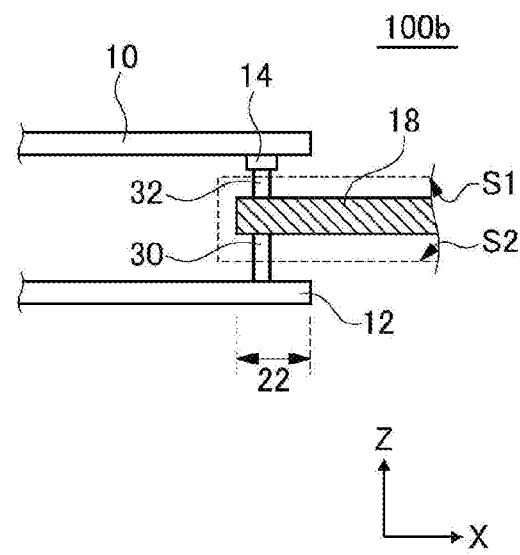

FIGS. 8A and 8B are views illustrating a structure of a second configuration 100b example of the touch type input device 100. Like FIG. 7A, the first line 16 and the second line 18 are installed to be spaced apart from each other in a same plane. As illustrated in FIG. 8A, the first line 16 is exposed from a first surface S1, and the second line 18 is exposed from a second surface S2. The cable 300 has the resistive film 10 and the conductor 12 therein in an end portion thereof. The first line 16 is connected to the electrode 14 through a post 32 and the second line 18 is connected to the conductor 12 through a post 30.

The configuration example 100b of FIGS. 8A and 8B has the following advantages. In the configuration of FIG. 7B, the resistive film 10 is required to be offset with respect to the conductor 12 by the post 30. In other words, a region corresponding to the post 30 and a region corresponding to the electrode 14 become the invalid region 22. In this connection, in the structure of FIG. 8B, since the region corresponding to the post 30 and the region corresponding to the post 32 (electrode 14) overlap, it is possible to further reduce a length of the invalid region 22 in the X axis direction.

Figure 9A:
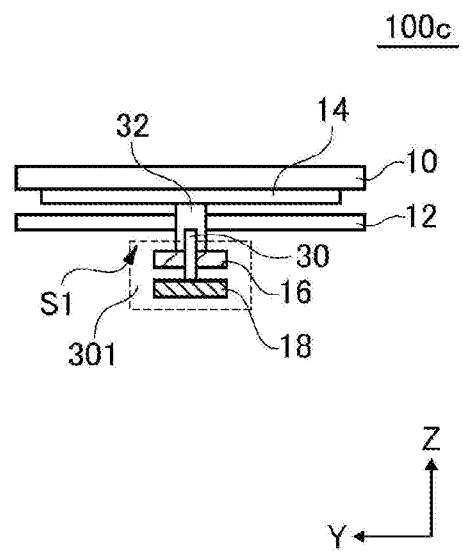
FIGS. 9A and 9B are views illustrating a structure of a third configuration example of the touch type input device.
Figure 9B:
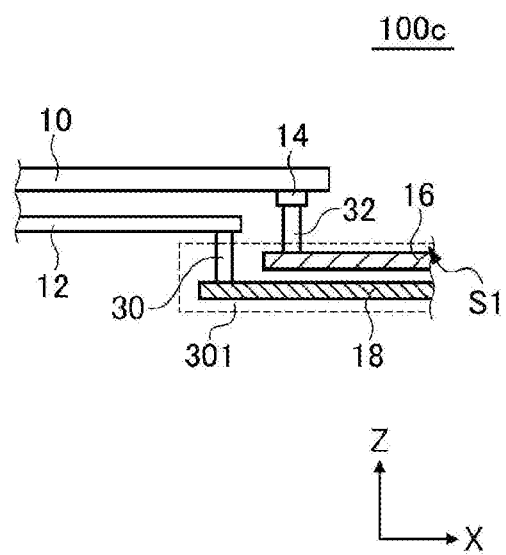

FIGS. 9A and 9B are views illustrating a structure of a third configuration example 100c of the touch type input device 100. In the configuration example 100c, the first line 16 and the second line 18 are stacked in the Z direction. The first line 16 and the second line 18 are exposed from the same surface S1 in the end portion of the cable 300. The first line 16 is connected to the electrode 14 through the post 32, and the second line 18 is connected to the conductor 12 through the post 30. According to this configuration example 100c, it is possible to reduce a width of the cable 300 in a traverse direction by stacking the first line 16 and the second line 18.

Figure 10A:
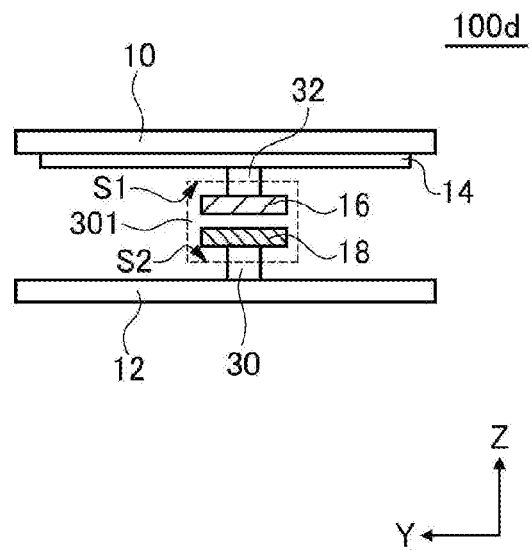
FIGS. 10A and 10B are views illustrating a structure of a fourth configuration example of the touch type input device.
Figure 10B:
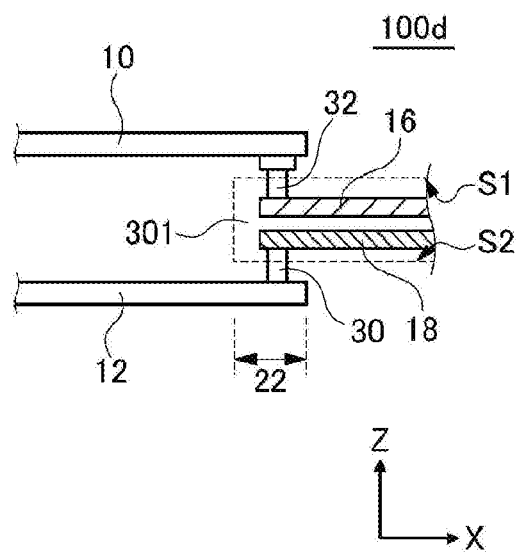

FIGS. 10A and 10B are views illustrating a structure of a fourth configuration example 100d of the touch type input device 100. Like the third configuration example 100c, the first line 16 and the second line 18 are stacked in the Z direction. The first line 16 is exposed from the first surface S1, and the second line 18 is exposed from the second surface S2 in the end portion of the cable 300. The first line 16 is connected to the electrode 14 through the post 32, and the second line 18 is connected to the conductor 12 through the post 30. According to the configuration example 100d, it is possible to reduce a width of the cable. In addition, compared with the third configuration example 100c, it is possible to reduce a length of the invalid region 22 in the X axis direction.

Figure 11:
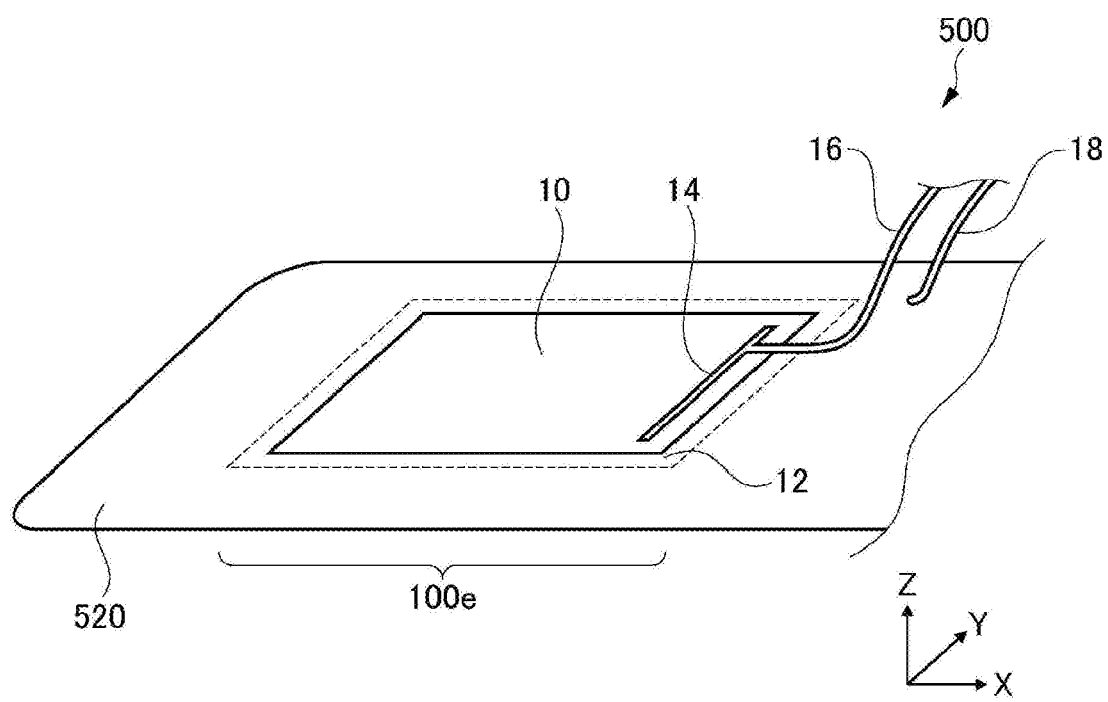
FIG. 11 is a view illustrating a fifth configuration example of the touch type input device.

FIG. 11 is a view illustrating a fifth configuration example 100e of the touch type input device 100. In this configuration example 100e, the conductor 12 is a portion of a metal 520 of an electronic device 500 on which the touch type input device 100 is mounted. For example, the metal 520 may be a housing of the electronic device 500 or may be a chassis. That is to say, the touch type input device 100e is formed by superposing the resistive film 10 on a portion of the metal 520.

Figure 12:
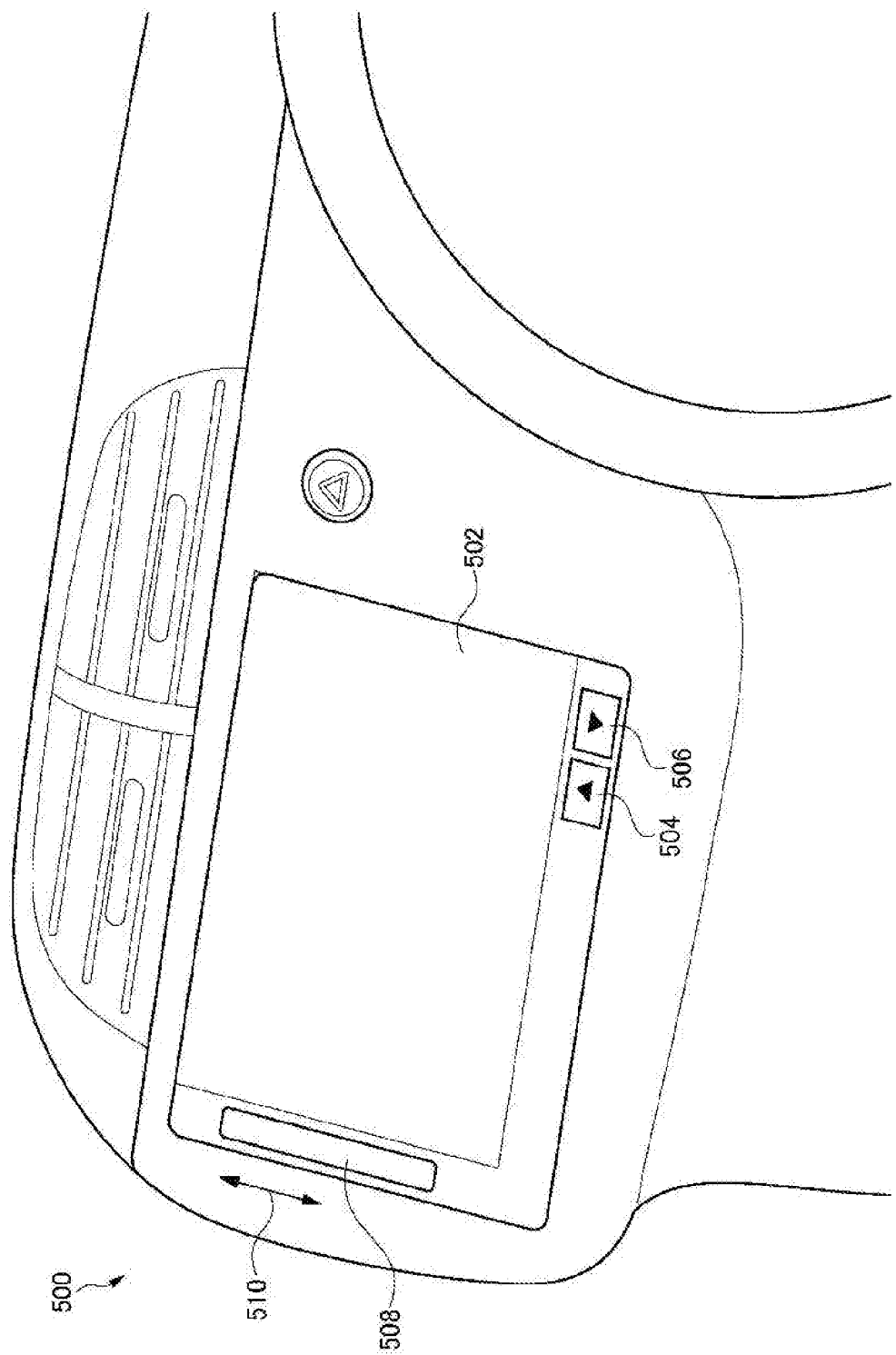
FIG. 12 is a view illustrating an electronic device including the touch type input device.

Next, applications of the touch type input device 100 will be described. FIG. 12 is a view illustrating an electronic device 500 including the touch type input device 100. A type of the electronic device 500 is not particularly limited and may be a smartphone or a table terminal, a digital still camera, a digital video camera, a portable audio player, a notebook PC, a portable game machine, a display device, a car navigation device, a game machine or a controller thereof, various remote controller devices, or the like. In FIG. 12, the electronic device 500 is a car navigation device. The car navigation device 500 is installed in a console of a vehicle. The car navigation device 500 has one or more input devices 504, 506, and 508, in addition to a display panel 502. The input devices 504, 506, and 508 are the aforementioned touch type input device 100. For example, each of the input devices 504 and 506 is used as a button (switch) for detecting two states of contact and non-contact states. For example, the input devices 504 and 506 may be used as a button to which a function of a volume up/volume down button, a map magnification/reduction button, a cursor button, a power button of the car navigation device 500, or a button to which any other certain function is allocated.

Further, the input device 508 may detect a position (coordinate) of a touch input. When the user moves his or her finger along an arrow 510 on the input device 508, the input device 508 may detect a movement of the touched position. The input device 508 may be used as a slide type volume, a slide type magnification/reduction button, or the like.

The present disclosure has been described above based on the embodiment. It is to be understood by those skilled in the art that the embodiment is merely illustrative and may be variously modified by any combination of the components or processes, and the modifications are also within the scope of the present disclosure. Hereinafter, these modifications will be described.

(First Modification)

The conductor 12 may have a mesh structure. With this configuration, the conductor 12 can become transparent. Thus, it is possible to dispose the touch type input device 100 on a display panel in an overlapping manner, like a related art resistive touch panel.

(Second Modification)

In the embodiment, the structure in which the resistive film 10 is deformable and the user touches the resistive film 10 side has been described, but the present disclosure is not limited thereto. When the conductor 12 has the same degree of flexibility as that of the resistive film 10, the conductor 12 may be deformable and the user may touch the conductor 12 side.

(Third Modification)

In the embodiment, a case where the resistive film 10 and the conductor 12 have a rectangular shape has been described, but the shape of the resistive film 10 and the conductor 12 is not particularly limited. For example, the resistive film 10 and the conductor 12 may have different shapes or may have a circular or oval shape, or may have a tapered trapezoidal or triangular shape.

According to some embodiments of the present disclosure in, it is possible to reduce an invalid region of a touch type input device.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An electronic device, comprising:
a touch type input device, comprising:
a resistive film in which a single electrode is formed, the electrode being arranged along one outer peripheral side of the resistive film without being arranged along other outer peripheral sides of the resistive film;
a conductor, in which an electrode is not formed, installed with a gap between the resistive film and the conductor;
a first line drawn from the electrode; and
a second line connected to the conductor; and
a control circuit connected to the first line and the second line of the touch type input device and configured to detect an input of a user,
wherein the resistive film and the conductor are configured to contact in a position touched by the user, wherein a resistance value of the conductor is substantially smaller than a resistance value of the resistive film such that the resistance value of the conductor is substantially zero when compared with the resistance value of the resistive film, and wherein the control circuit is configured to detect the position touched by the user based on a sum of the resistance value of the resistive film between the electrode and the position touched by the user, and a contact resistance value between the resistive film and the conductor.

2. The electronic device of claim 1, wherein the first line and the second line are accommodated in a single cable and installed to be spaced apart from each other in a same plane in the cable, and the first line and the second line are exposed from a same surface in an end portion of the cable.

3. The electronic device of claim 1, wherein the first line and the second line are accommodated in a single cable and installed to be spaced apart from each other in a same plane in the cable, and the first line is exposed from one surface in an end portion of the cable and the second line is exposed from another surface opposing the one surface in the end portion of the cable, the cable being interposed between the electrode and the conductor in the end portion.

4. The electronic device of claim 1, wherein the first line and the second line are accommodated in a single cable and form a stacked structure with an insulating layer interposed therebetween in the cable, and the first line and the second line are exposed from a same surface in an end portion of the cable.

5. The electronic device of claim 1, wherein the first line and the second line are accommodated in a single cable and form a stacked structure with an insulating layer interposed therebetween in the cable, and the first line is exposed from one surface in an end portion of the cable and the second line is exposed from another surface opposing the one surface in the end portion of the cable, the cable being interposed between the electrode and the conductor in the end portion.

6. The electronic device of claim 1, wherein the conductor is a portion of a metal of the electronic device on which the touch type input device is mounted.

7. The electronic device of claim 1, wherein the conductor has a mesh structure.

8. The electronic device of claim 1, wherein the control circuit is configured to detect a presence or absence of a touch of the user.

9. The electronic device of claim 1, wherein the control circuit is configured to detect a coordinate of the position touched by the user in a direction perpendicular to the electrode.

10. A touch type input device, comprising:

a resistive film in which a single electrode is formed, the electrode being arranged along one outer peripheral side of the resistive film without being arranged along other outer peripheral sides of the resistive film;

a conductor, in which an electrode is not formed, installed with a gap between the resistive film and the conductor;

a first line drawn from the electrode; and a second line connected to the conductor, wherein the resistive film and the conductor are configured to contact in a position touched by a user, wherein a resistance value of the conductor is substantially smaller than a resistance value of the resistive film such that the resistance value of the conductor is substantially zero when compared with the resistance value of the resistive film, and wherein the position touched by the user correlates with a sum of the resistance value of the resistive film between the electrode and the position touched by the user, and a contact resistance value between the resistive film and the conductor.

* * * * *